May 16, 1967  V. P. DONNER  3,319,648
PRESSURE-COMPENSATED FLOW CONTROL VALVES
Filed April 27, 1965  2 Sheets-Sheet 1
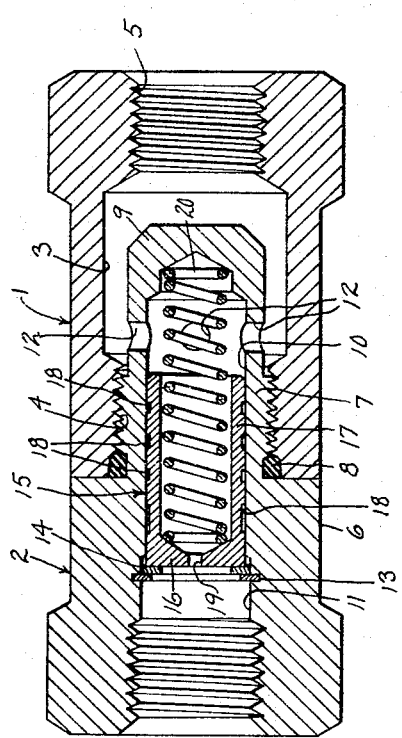
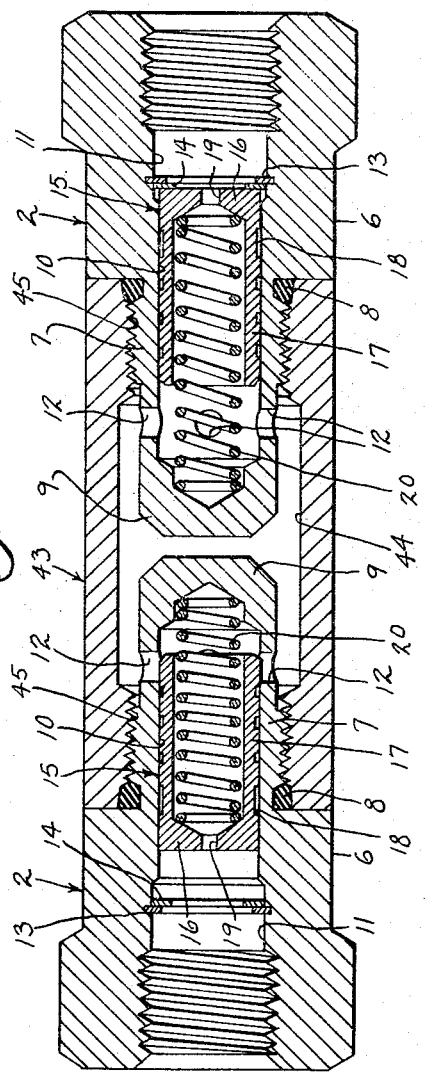
INVENTOR
VERNE P. DONNER
BY *Allan W. Leiser*
ATTORNEY

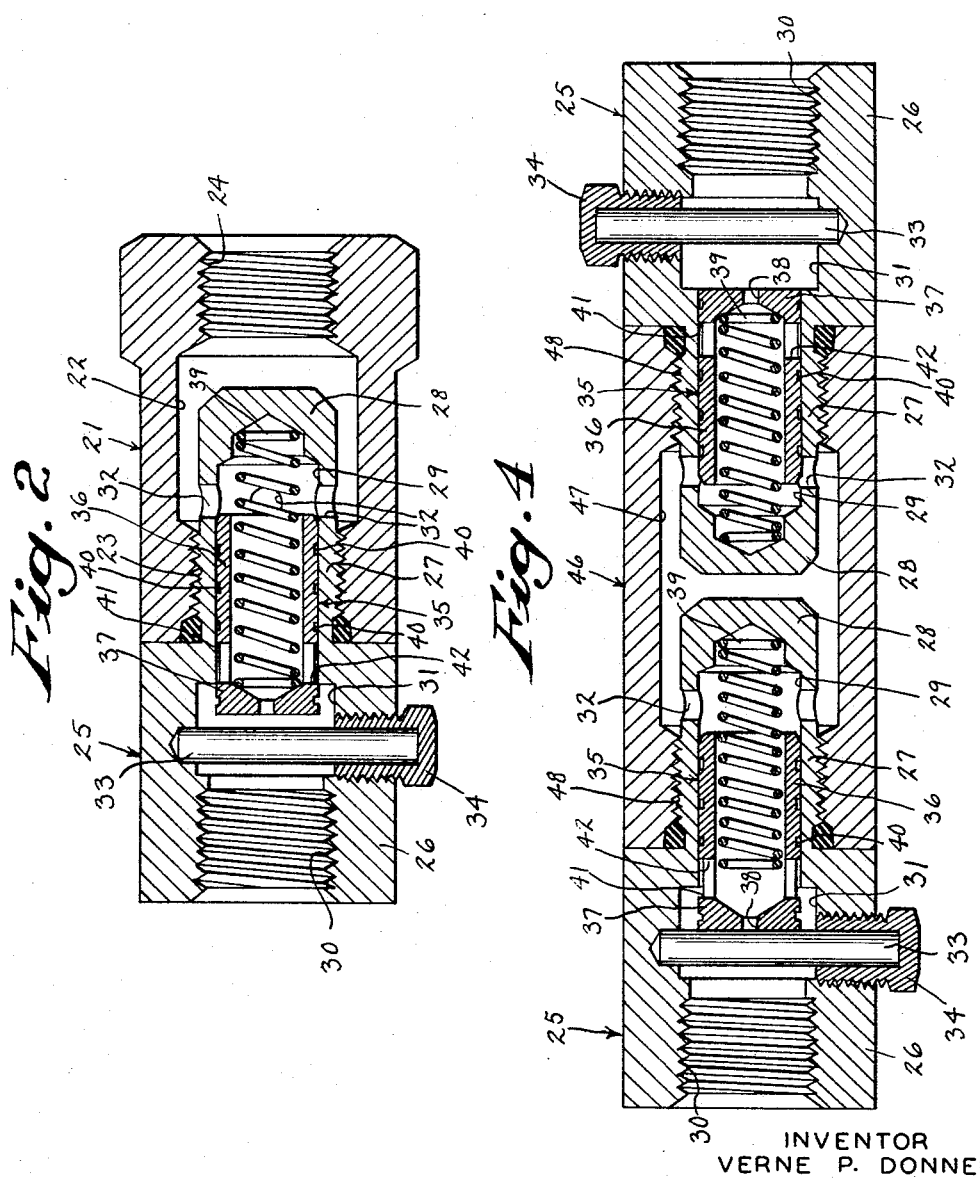

United States Patent Office 3,319,648
Patented May 16, 1967

3,319,648
PRESSURE-COMPENSATED FLOW
CONTROL VALVES
Verne P. Donner, Palatine, Ill., assignor to Deltrol Corp.,
Bellwood, Ill., a corporation of Delaware
Filed Apr. 27, 1965, Ser. No. 451,224
2 Claims. (Cl. 137—504)

This invention relates to pressure-compensated flow control valves of the non-adjustable type including a valve element movable in response to pressure variations to vary the effective size of a fluid passage through the valve. Such valves are useful in many fluid systems where it is desired to provide for a constant rate of flow in spite of pressure changes caused, for example, by load variations.

It is the general object of this invention to provide an improved pressure-compensated flow control valve construction which utilizes a piston-like valve element that is movable across a wall port in a cylinder to vary the effective size of a through passage and thus provide for a relatively constant flow rate even in the face of substantial pressure variations.

It is another object of this invention to provide an alternative valve construction of the same general type, but which has provision for a free reverse flow.

It is a further object of this invention to provide other alternative constructions which afford flow control in both directions, with or without provision for free reverse flow.

It is still another object of the invention to provide several embodiments of flow control valves, all of which are effective and fast-acting, long wearing, relatively simple and inexpensive to manufacture, and easy to incorporate in various fluid systems.

Other objects and advantages will appear from the description to follow. In the description, reference is made to the accompanying drawings, forming a part hereof, in which there are shown, by way of illustration and not of limitation, four embodiments of the invention.

In the drawings:

FIG. 1 is a view in cross-section of a first embodiment of the invention providing flow rate control in one direction only, FIG. 2 is a view in cross-section of a second embodiment similar to the embodiment of FIG. 1, but providing for free reverse flow, FIG. 3 is a view in cross-section of a third embodiment providing for flow control in both directions, and FIG. 4 is a view in cross-section of a fourth embodiment similar to the embodiment of FIG. 3, but providing for free reverse flow for each element thereby imposing no unnecessary restraint upon the controlled flow. This is true for each flow direction.

The embodiment of FIG. 1, which provides for flow control in one direction only, is suitable for use in any fluid system where it is desired to maintain a constant flow rate in spite of substantial pressure variations. This embodiment includes a hollow bonnet member designated generally by the reference numeral 1, and a valve unit or housing designated generally by the reference numeral 2. The bonnet 1 is generally tubular and defines an enlarged central cavity 3 and two threaded openings leading therefrom, a valve opening 4 which receives the valve unit 2 and an outlet opening 5 that is adapted to be connected to a fluid line.

The valve housing 2 comprises an enlarged head portion 6 and a smaller cylindrical chamber or cylinder portion 7 that is provided with external threads to engage with the threads of the valve opening 4. When the bonnet 1 and the valve unit 2 are assembled, the chamber portion 7 extends through the opening 4 and into the bonnet cavity 3. The enlarged head portion 6 defines a flat shoulder which sealingly abuts the flat end of the bonnet 1, and an O-ring 8 seated in an annular recess formed in the bonnet 1 is compressed therebetween to insure a complete seal.

The housing 2 is hollowed to define a closed inner end 9 disposed in the cavity 3 and a cylindrical bore which opens outwardly through the head portion 6, the bore comprising a relatively smaller inner cylinder portion 10 leading from the end 9 and a relatively larger threaded outer inlet portion 11 that is adapted to be connected to a fluid line.

The wall of the chamber portion 7 is provided therethrough with four radial wall ports 12 which are near the closed end 9 and which lie inside the cavity 3 when the bonnet 1 and housing 2 are assembled. The wall ports 12 serve as the only means of communication between the bore of the housing 2 and the cavity 3.

Seated in the bore inlet portion 11 are an outer split retainer ring 13 and an inner metal washer 14, which together serve as a stop means for a piston as will be described.

A cylindrical piston or valve member 15 is slidably disposed within the bore cylinder portion 10 with a relatively close fit. The piston 15 has a flat head 16 which faces the bore inlet portion 11 and a barrel or skirt 17 which faces the closed end 9. The outer surface of the skirt 17 is provided with a series of annular lubricating and cleaning grooves 18 in the usual fashion. A fluid port 19 extends through the piston head 16 and serves to establish communication between the inlet portion 11 and the ports 12.

When the inlet portion 11 and the outlet opening 5 are connected to fluid lines, fluid may pass through the inlet 11, the port 19, the cylinder portion 10, the ports 12, the cavity 3 and the outlet opening 5, which together, therefore, define a through passage running through the valve.

A compression spring 20 is disposed in the bore cylinder portion 10 and operates between the closed housing end 9 and the underside of the piston head 16 to urge the piston 15 to the left as seen in FIG. 1 against the washer 14 and ring 13. In this position, which can be termed a normal or retracted position for the piston 15, the skirt 17 is outwardly removed from the ports 12 and fluid may flow through the through passage without impedance. The passage is normally fully open in this manner.

Assuming a flow through the inlet 11 and that the through passage remains open, the rate of flow will depend on the size of the port 19, which is the smallest orifice, and the pressure exerted by the fluid. That is, as pressure increases the rate of flow through the port 19 will also increase. Whenever there is a fluid flow through the inlet 11, however, a force is exerted by the fluid on the piston head 16, which force tends to move the piston 15 toward the right, the force being dependent on fluid pressure. If there is sufficient pressure, the piston 15 will be moved to the right against the spring 20 to a closed postion in which the ports 12 are at least partially covered by the skirt 17. When the total open area of the four ports 12 becomes less than the size of the port 19, the flow rate will of course be reduced. Thus, pressure variations cause, in effect, a variation in the effective size of the through passage so that the flow rate will remain substantially constant.

In the event of very high pressures, the piston 15 may completely seal off the ports 12, at least momentarily. As soon as this occurs, however, there is no longer any pressure drop across the piston 15 and the spring 20 is able to move the piston 15 back toward its retracted position to open the ports 12 at least partially. Again, therefore, the flow rate remains substantially constant.

The actual flow rate through any valve formed according to this invention will depend upon a number of factors including the size of the piston head 16, the sizes of the ports 12 and 19, and the strength of the spring 20. There is no provision for adjustment, except by means of replacement of parts, so that the flow rate for a particular valve is permanently established by the construction of the valve. It will be obvious to those skilled in the art, however, that the dimensions of the various elements can be selected to provide, at least within a reasonable range, a pre-determined flow rate. Individual valves can then be tested to establish their exact flow rates. Since there are relatively few moving parts, the flow rate for a given valve will remain constant even after long use. The relatively uncomplicated construction of the valve also helps in providing for a fast action to minimize temporary fluctuations in flow rate. Having the ports 12 circular also helps in providing extremely rapid action. When the skirt 17 is in a position where it almost seals off the ports 12, a very slight axial movement of the skirt 17 will work a substantial change in the open area of the ports 12.

Upon a cessation of flow, the spring 20 will move the piston 15 back to its normal or retracted position, clearing the ports 12. Should there be a reverse flow, the piston 15 will of course remain retracted, and the reverse flow rate will be subject to pressure variation.

The embodiment of the invention shown in FIG. 2 is quite similar in basic respects to the embodiment of FIG. 1, but it additionally provides for a free reverse flow. This might be desirable, for example, in connection with a hydraulic ram where a constant flow rate in one direction is desirable to insure that the ram will react at a constant rate of speed under varying loads, but where a free reverse flow is necessary so that the ram can be re-extended quickly.

The embodiment of FIG. 2 includes a bonnet 21 identical to the bonnet 1 which defines a cavity 22, a threaded valve opening 23, and a threaded outlet opening 24 that is adapted to be connected to a fluid line. A housing 25 is provided that is similar to the housing 2 and includes an enlarged head portion 26 and a smaller cylindrical chamber portion 27. Like the housing 2, the housing 25 is hollowed to define a closed end 28 disposed within the chamber 27 and a bore which opens outwardly therefrom through the head portion 26. The bore includes a relatively smaller cylinder portion 29, like the cylinder portion 10, near the closed end 28 and a relatively larger threaded inlet portion 30, like the inlet portion 11, that is adapted to be connected to a fluid line. Intermediate the bore portions 29 and 30, however, is an enlarged chamber portion 31.

The wall of the chamber portion 27 is provided with four circular radial wall ports 32 near the closed end 28 and within the bonnet cavity 22.

A stop pin 33 extends across the chamber 31 and is held in place by a plug 34 threaded into the housing head portion 26.

A piston valve member 35, similar to the piston 15, is slidably disposed in the cylinder bore portion 29 and has a skirt 36 facing the closed end 28 and a head 37 facing the inlet 30. The head 37 is provided with a fluid bore 38 therethrough. A compression spring 39 operates between the closed end 28 and the underside of the piston head 37 to urge the piston 35 to the left as seen in FIG. 2.

The outer surface of the skirt 36 is provided with a series of annular grooves 40 and a substantially wider outermost groove 41 near the head 37. Extending through the skirt 36 within the groove 41 are a pair of oppositely disposed relatively large circular reverse ports 42.

In FIG. 2, the spring 39 is shown extended to its full free length. When the spring 39 is thus extended, the piston 35 is in what can be termed a normal or retracted position. That is, the skirt 36 is removed from the ports 32 so that there can be a free flow of fluid through the bore 38 and out the ports 32. When the piston 35 is in retracted position, the ports 42 are within the cylinder bore portion 29 and are thus sealed off so there can be no fluid flow therethrough, and the piston head 37 is spaced inwardly of the stop pin 33. Should there be a flow of fluid through the inlet 30, the pressure exerted on the piston head 37 will tend to move the piston 35 to the right toward a closed position in which the skirt 36 partially covers over the ports 32. For normal flow, therefore, the embodiment of FIG. 2 functions identically to the embodiment of FIG. 1.

With the embodiment of FIG. 2, however, a reverse flow through the outlet 24 will act on the underside of the piston head 37 to move the piston to the left from the position of FIG. 2 and against the stop pin 33 to what can be termed an open position. In open position, the ports 42 open into the chamber 31 to provide for a free reverse flow. Having the ports 42 in the groove 41 is advantageous in that the space between the floor of the groove 41 and the cylinder bore portion 29 allows for a free flow through the ports 42 even when they are only partially exposed as at the very beginning of a reverse flow.

Upon a termination of the reverse flow, the piston 35 will be left against the pin 33 with the ports 42 exposed. The piston 35 is, however, freely slidable so that a very slight flow through the inlet 30 will be sufficient to move the piston 34 back to the normal position shown in FIG. 2.

The embodiment of the invention shown in FIG. 3 is very similar to the embodiment of FIG. 1, and like reference numerals have, therefore, been applied to many of the elements. In the embodiment of FIG. 3, however, there is a somewhat longer bonnet 43 that is sleeve-like and defines a central cavity 44 and a pair of opposite threaded valve openings 45 leading therefrom.

Threaded in the openings 45 are two valve housing members 2 which are both identical to the valve housing 2 of FIG. 1. The various elements of the housings 2 in FIG. 3 have, therefore, been given the same reference numeral used for the corresponding elements in FIG. 1.

It will be appreciated that the embodiment of FIG. 3 operates the same as the embodiment of FIG. 1 but provides for a controlled flow rate in both directions. In FIG. 3 the two pistons 15 are shown in the positions assumed when there is a flow from the left. That is, the left-hand piston 15 has been moved to the right to partially cover its associated ports 12 and be in its closed position. The right-hand piston 15 is, however, in its retracted position to the right against its associated washer 14 and ring 13.

The embodiment of the invention shown in FIG. 4 is similar to the embodiment of FIG. 2. In the embodiment of FIG. 4 there is an elongated sleeve-like bonnet 46 defining a central cavity 47 and two threaded valve openings 48 leading outwardly therefrom. Threaded into the openings 48 are two valve housings 25 which are identical to the housing 25 of FIG. 2. The various elements of the housings 25 have been assigned the same reference numerals used for the housing 25 of FIG. 2.

It will be appreciated that the embodiment of FIG. 4 provides for controlled flow in both directions and for free reverse flow in both directions. In FIG. 4, the valve is shown in the position assumed in the event of a flow from the right. That is, the right-hand piston 35 has been moved to the left to its closed position in which it partially covers its associated ports 32. The left-hand piston 35 has also been moved to the left to its open position against the associated stop pin 33, in which position the ports 42 are exposed to provide for free flow.

The embodiments of FIGS. 3 and 4 are useful in any case where it is desired to provide for controlled flow rates in both directions. With the embodiment of FIG. 4, there is a free reverse flow to insure that neither valve housing unit hampers the operation of the other by restricting flow. With either embodiment, it is possible to provide for equal or unequal flow rates in respective directions by selecting housing units of the same or different characteristics. If desired, it is quite easy to replace one or both housing units to alter the characteristics of the valve. These embodiments are also advantageous in that they are quite compact and easily incorporated in any fluid system.

Although preferred embodiments of the invention have been shown and described herein, it should be obvious that variations could be made without departure from the invention. It is not intended, therefore, that the invention be limited by the particular embodiments shown, except insofar as limitations specifically appear in the following claims.

I claim:

1. In a pressure-compensated flow control valve, the combination comprisnig: a sleeve-like bonnet defining a central cavity and a pair of valve openings leading outwardly therefrom at opposite ends; a pair of valve housings fitted to the bonnet at the openings, each of said housings comprising an enlarged head portion abuttingly engaging an assocaited end of the bonnet and a chamber portion extending through the associated valve opening into the cavity, each housing being hollowed to define a closed inner end in the cavity and a bore leading outwardly therefrom through the head portion to define an inlet adapted to be connected to a fluid line, there being an enlarged chamber intermediate the ends of the bore, each housing having a wall port near the closed end that affords communication between the bore and the bonnet cavity; a pair of piston valve members, one slidably disposed in each bore between the closed inner end and the enlarged chamber, each piston having a head facing the inlet and a skirt facing the closed end, the heads of the pistons being provided with fluid ports therethrough, each piston being movable between an inner closed position wherein its skirt at least partially covers the associated wall port, an intermediate retracted position wherein the skirt is removed from the wall port, and an outer open position wherein its head extends into the enlarged chamber, each piston being provided with a reverse port extending through its skirt near its head which extends into the enlarged chamber only when the piston is in its open position; and bias means in each bore operating between the closed end and the underside of the piston head to urge the piston towards its open position.

2. In a pressure-compensated flow control valve, the combination comprising: a sleeve-like bonnet defining a central cavity and a pair of valve openings leading outwardly therefrom at opposite ends; a pair of valve housings fitted to the bonnet at the openings, each of said housings comprising an enlarged head portion abuttingly engaging an associated end of the bonnet and a chamber portion extending through the associated valve opening into the cavity, each housing being hollowed to define a closed inner end and a bore leading outwardly therefrom through the head portion to define an inlet adapted to be connected to a fluid line, there being an enlarged chamber intermediate the ends of the bore, each housing being provided with a wall port affording communication between the bore and the bonnet cavity; stop means in each bore; a pair of piston valve members, one slidably disposed in each bore between the closed inner end and the enlarged chamber, each piston having a head facing the inlet and a skirt facing the closed end of the housing, the head of each piston being provided with a fluid port therethrough, each piston being movable between an inner closed position wherein its skirt at least partially covers the associated wall port, an intermediate retracted position wherein the skirt is removed from the wall port and an outer open position against the stop means wherein its head extends into the enlarged chamber, each piston being provided with a reverse port extending through its skirt near its head which extends into the enlarged chamber only when the piston is in its open position; and bias means in each bore operating between the closed end and the underside of the piston head to urge the piston toward its retracted position.

References Cited by the Examiner

UNITED STATES PATENTS

| 2,198,487 | 4/1940 | Sisk | 137—504 |
| 2,554,390 | 5/1951 | Stevenson | 137—219 |
| 2,845,086 | 7/1958 | Waterman et al. | 137—504 |
| 2,845,087 | 7/1958 | Thomas | 137—504 |
| 3,015,341 | 1/1962 | Hedland et al. | 137—504 X |

M. CARY NELSON, *Primary Examiner.*